United States Patent [19]

Greenfield et al.

[11] E Re. 29,304

[45] Reissued July 12, 1977

[54] PLASMA LIGHT SOURCE FOR SPECTROSCOPIC INVESTIGATION

[75] Inventors: Stanley Greenfield; Iorwerth Llewelyn William Jones; Christopher Thomas Berry, all of Birmingham, England

[73] Assignees: Raydne Limited, Workingham; Albright & Wilson (Mfg.) Limited, Oldbury, both of England

[21] Appl. No.: 628,071

[22] Filed: Nov. 3, 1975

Related U.S. Patent Documents

Reissue of:

[64] Patent No.: 3,467,471
Issued: Sept. 16, 1969
Appl. No.: 404,625
Filed: Oct. 19, 1964

[30] Foreign Application Priority Data

| | | |
|---|---|---|
| Oct. 21, 1963 | United Kingdom | 41456/63 |
| Mar. 6, 1964 | United Kingdom | 9535/64 |
| Oct. 5, 1964 | United Kingdom | 40487/64 |

[51] Int. Cl.[2] ..... G01N 21/54; G01N 1/04; G01J 3/28; G01J 3/50

[52] U.S. Cl. ..... 356/85; 219/121 P; 356/36; 356/187; 313/231.3; 315/111.1; 315/111.2

[58] Field of Search ..... 356/36, 85, 87; 219/121 P; 313/231.3, 231.5; 315/111.1, 111.2, 111.3

[56] References Cited

U.S. PATENT DOCUMENTS

| | | | |
|---|---|---|---|
| 2,562,874 | 7/1951 | Weichselbaum | 356/87 |
| 2,714,833 | 8/1955 | Gilbert | 431/126 |
| 3,264,508 | 8/1966 | Lai et al. | 219/121 P |
| 3,296,410 | 1/1967 | Hedger | 315/111 |
| 3,324,334 | 6/1967 | Reed | 313/231.3 |

OTHER PUBLICATIONS

"Induction–Coupled Plasma Torch"; Reed; Journal of Applied Physics; vol. 32, No. 5; May 1961; pp. 821–824.

"Growth of . . . Crystals . . . Plasma Torch"; Reed; Journal of Applied Physics; vol. 32; No. 12; Dec. 1961; pp. 2534–2535.

Plasma Torches; Reed; International Science & Technology; June 1962; pp. 42–48.

*Primary Examiner*—Vincent P. McGraw
*Attorney, Agent, or Firm*—Flynn & Frishauf

[57] ABSTRACT

A plasma of annular form is produced by passing a gas stream along the axis of a coil carrying high frequency-alternating current and a sample is injected through a low temperature central region of the plasma annulus into the tail flame and the resulting spectrum of the plasma is examined.

13 Claims, 3 Drawing Figures

POWER SUPPLY
24
20
21
22
23
3

POWER SUPPLY
24
H.F. GEN.
28
1
3
29
30
33
31
32
34
35
37
38
39
40
41
42
43
M

PLASMA LIGHT SOURCE FOR SPECTROSCOPIC INVESTIGATION

Matter enclosed in heavy brackets [ ] appears in the original patent but forms no part of this reissue specification; matter printed in italics indicates the additions made by reissue.

This invention relates to the production of a gas plasma and to the spectroscopic examination of the radiation emitted therefrom, and may be used for the control of manufacturing processes which require the analysis of raw material or a product. An example of such a process is the electric reduction process for making phosphorus.

It is known to carry out the spectroscopic analysis of materials by introducing a sample of the material into the hot plasma gas of an electric arc. This method necessitates the presence of arc-emitting electrodes which may themselves emit intense characteristic radiation. In an attempt to separate the plasma from the confinement of the electrodes and so separate the radiation emitted by the sample from that emitted by the electrodes, liquid samples have been atomised, and a jet of the resulting aerosol directed into the plasma column of a D.C. arc plasma jet. The plasma column is nevertheless not entirely free from contamination by material from the electrodes. A further disadvantage of this type of plasma source is that the electrodes are fairly readily corroded; this limits the kinds of gas that may be used to form the plasma and necessitates frequent replacement of the electrodes. The aerosol injection system, which is only applicable to liquids, including solutions, admits a very small proportion of the total sample to the plasma, and in low concentrations, thus reducing the sensitivity of the apparatus.

We have now discovered a method of avoiding the disadvantages imposed by an electrode-maintained arc.

According to our invention, for the spectroscopic investigation of a sample a stream of gas is passed along the axis of an electrically conductive coil and a high frequency alternating current is passed through the coil so that the heating of the gas by the resulting high frequency alternating electric field serves to maintain a plasma within the gas stream; a sample is introduced into the gas plasma and the spectrum of the plasma is examined downstream of the point of injection.

We have also discovered that, when a heated gas plasma is maintained by the action of a high frequency electric field, which is modulated by a waveform of such frequency and amplitude that the plasma does not deionise while the field passes through the modulation troughs, when the temperature of the plasma will undergo a cyclic variation at the modulation frequency. This cyclic variation causes a corresponding variation in the total intensity of the emitted radiation, so that when the radiation falls upon a photoelectric cell, an alternating current is produced. The output of a photoelectric call requires amplification to be of practical use. It is very much simpler to amplify an alternating current than the direct current produced by a photoelectric cell under constant illumination. It has hitherto been the general practice to interrupt at regular intervals a beam of the radiation being analysed, for example by means of a rotating shutter, so that the resulting intermittent radiation falling upon the photometer produces an alternating current. The use of a modulated high frequency signal removes the need for a mechanical interrupter.

A further advantage of using a modulated high frequency signal is that it enables the problem of temperature selection to be solved. With prior methods and apparatus, in order to conduct analyses at widely differing temperatures it has been necessary to employ different kinds of source, each appropriate to a particular temperature range. For example a coal gas/air burner may be used for lower temperatures, while electric arcs are frequently employed for high temperatures. Finer temperature control has only been possible either by viewing only the radiation emitted from a certain region of the source, or by making complicated alterations in operating conditions, such as power supply and rate of delivery of gas. If a modulated high frequency field is employed and the emission from the pulsating plasma source is intermittently interrupted, for example by a mechanical beam interrupter, suitably synchronised with the modulation of the HF current to produce a stroboscopic effect, then only the radiation emitted at a particular temperature is allowed to fall upon any analysing or measuring device.

Alternatively, the maximum temperature of the plasma may be adjusted so that it equals the desired temperature by passing the modulated high frequency signal through an amplitude limiter. This has the effect of extending the period in each cycle for which the plasma is at the desired temperature while preserving the alternating character of the signal from the photocell. If desired, the radiation resulting from the plasma maintained by this amplitude limited modulated high frequency signal may be subjected to stroboscopic interruptions as described above, to remove the low temperature components of radiation. In this case the periods available for examination of the radiation by the photometer may be greatly extended. However, this is not always necessary as the temperature is at the desired value for a considerable proportion of each cycle and the part of the cycle at lower temperatures may be ignored as a first approximation.

Where stroboscopic temperature selection is desired the interrupting mechanism may comprise a rotating disc provided with a radial slit, or more conveniently a rotating barrel with a narrowly spaced, multi-shuttered, axially placed slit. Such a disc or barrel may be rotated in a beam of radiation from the plasma, the phasing of the rotation being adjusted so that only the radiation emitted during a particular phase of the plasma temperature cycle is allowed to pass through the slit. The particular phase desired may be readily selected by rotating the motor about its shaft when it is revolving at its correct speed.

A preferred form of interrupter is a form of the Kerr or Karolus cell, through which light may only pass when the plates of a capacitor are charged. If a variable voltage of the same frequency as the modulation on the high frequency current used to maintain the plasma is applied to the plates of such a cell, then a particular temperature for examination may be selected by adjusting the phase of the voltage applied to the cell with respect to the phase of the temperature cycle of the plasma.

In order to examine the radiation any conventional spectrometer or photometer may be used, but where a plasma maintained by a modulated high frequency current is employed the need for a mechanical "chopper" to interrupt the beam of radiation is eliminated.

The high frequency alternating current may have a frequency of 5 to 3000 mc./s. and is preferably between 5 and 200 mc./s. while the modulation may, for example, have a frequency of from 100 to 360 c./s. This may be conveniently achieved by supplying the high-frequency oscillator valve with a full-wave rectified mains voltage which is not fully smoothed. It is preferred to include means for controlling the amplitude of the modulation superimposed on the H.T. output voltage, for example by the use of a variable D.C. smoothing circuit between the oscillator and the source of rectified mains voltage. Either a capacitance or an inductance in the smoothing circuit may be adjusted.

The plasma may be maintained by means of an apparatus which comprises: a tubular vessel, closed at one end and encircled externally and coaxially by a coil for carrying the high frequency alternating current a plasma gas supply tube projecting coaxially through the closed end of the vessel and provided with an inlet for the entry of the plasma gas; a sample injector for injecting sample material into a plasma, formed during operation within the coil and beyond the injector and plasma gas supply tube: and an inlet near the closed end of the vessel for the entry thereto of an insulating fluid. For maximum stability the plasma should be annular in form having a low temperature central region through which a jet of the sample is directed into the region of the plasma tail flame. To obtain a plasma with a stable annular form, alternating currents having frequencies of from 5 to 3000 mc./s. are required, depending on the desired diameter of the plasma and the coil should have at least two turns. The smaller the diameter of plasma desired, the greater is the frequency required to generate a stable annular plasma. For generating an annular plasma in a vessel of from 25 to 35 mm. diameter, current frequencies of from 5 to 200 mc./s. give good results. The optimum power output for the high frequency source depends on the design and efficiency of the coil and on the dimensions of the apparatus. The power requirements are also dependent to a large extent upon the type of inert atmosphere employed. The temperature and intensity of the plasma may be controlled by varying the power supplied to the coil. Normally one end of the coil is earthed and the other end connected to a high frequency source. In these circumstances the voltage potential and hence the intensity of the resulting plasma is greater the closer that part is to the high potential end of the coil. A plasma will be most readily formed at the live end of the coil, and for a long coil may only be formed near that end. The coil should be positioned with respect to the apparatus so that the part within which the plasma is generated lies beyond the end of the plasma gas supply tube and the end of the injector. The plane of the first live half-turn of the coil is preferably perpendicular to the axis of the coil.

Stable plasmas are most readily obtained when a rotary motion is imparted to the plasma gas stream; this may be conveniently achieved by admitting the gas tangentially into the plasma gas supply tube. By adjusting the pressure uner which the plasma gas, insulating gas and sample injection gas are delivered, suitable rates of flow may be obtained. These will depend on the dimensions of the apparatus, but may be determined in any particular instance by simple experimental variation of the three flow rates. In general too fast a delivery of plasma gas and/or sample injection gas will cause the plasma to be "blown out". The insulating gas may conveniently be delivered at a rate of from 3 to 5 times that of the plasma gas, being too rapid a rate to permit a plasma to form in the insulating stream.

Any gas may be used to form the plasma, but argon, helium, nitrogen and oxygen are preferred. It is most convenient to use the same gas for the plasma gas and the insulating fluid, as well as any gas used for injecting the sample. A mixture of two gases is often desirable in order to achieve a stable plasma and reduce background interference. A mixture of 80% nitrogen and 20% argon gives less background interference than pure argon. In general, monatomic gases are preferred to polyatomic gases, since the latter give rise to more complex background spectra. The excitation atmosphere may be neutra, reducing or oxidising. The insulating fluid may be a liquid, such as water.

In order that the invention may be better understood one example of apparatus embodying the invention will now be described with reference to the accompanying drawings, in which.

Figure 1:
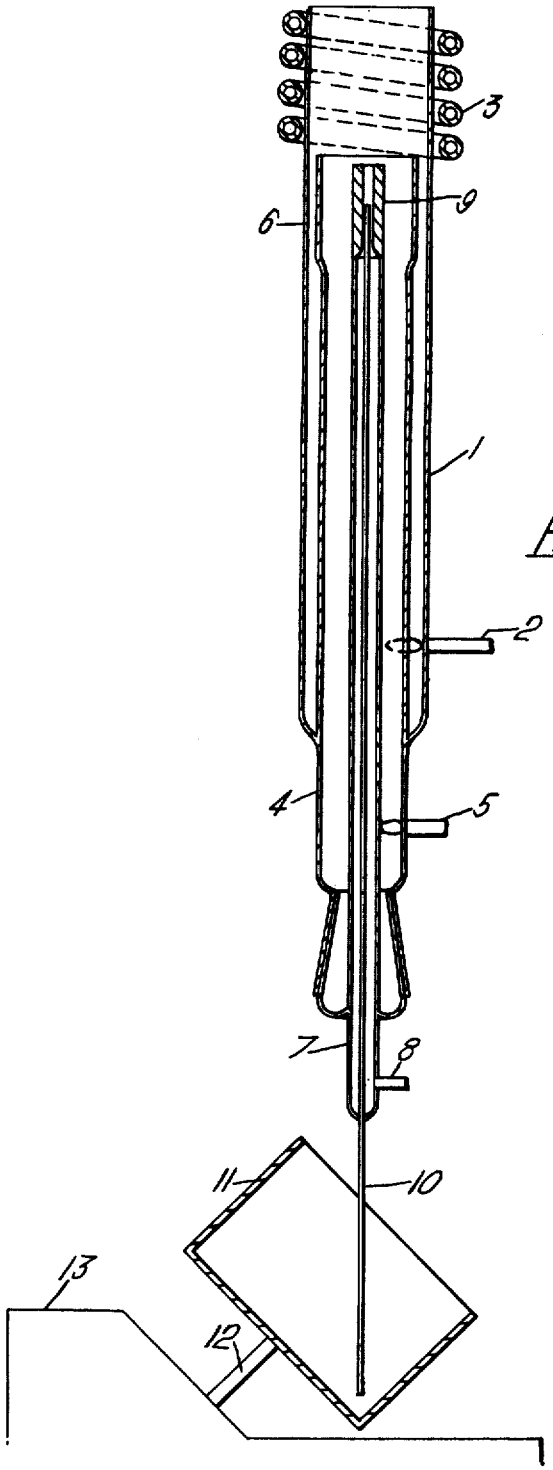
FIG. 1 is a diagrammatic representation of the plasma containing tube encircled by the coil.

The apparatus of FIG. 1 comprises a tubular vessel 1 (which may have a diameter of 25 mm.) open at one end and provided near the closed end with a tangential inlet 2 for an insulating gas. The vessel 1 is encircled externally and coaxially by a coil 3, which may conveniently have an internal diameter of 30 mm. and comprises, in this example, three and a half turns of copper tubing. The plane of that half turn of the coil which lies nearest the open end of the vessel is perpendicular to the axis of the coil. 6 mm. diameter copper tubing may conveniently be used to form the coil and the spacing between the turns may, for example, be 5 mm. Projecting coaxially through the closed end of the vessel 1 is a plasma gas supply tube 4 which is closed at the end lying outside the vessel 1 and is provided with a tangential inlet 5 for plasma gas. The diameter of the plasma gas supply tube increases near the open end to form a tubular skirt 6 (which in this example is 20.5 mm. in diameter and 22 mm. in length and may terminate from 20 to 40 mm. from the open end of the vessel 1 and adjacent to the first turn of the high frequency coil. A sample injector projects coaxially through the closed end of the plasma gas supply tube 4. The said sample injector comprises two coaxial tubes, of which the outer tube 7 is provided with an inlet 8 and terminates, at the end lying within the plasma gas supply tube 4, in a jet 9, the other end being sealed about the inner, capillary tube 10. One extremity of the tube 10 lies within the jet 9, the other extremity projecting into a reservoir formed by an inclined drum 11 which may be rotated about a shaft 12 by a motor 13.

The vessel 1, the tube 4 and the jet 9 are constructed of a heat-resistant material such as silica or quartz. Those parts of the tube 7 and the capillary 10 which are remote from the plasma may, however, be constructed of plastic or metal. If desired, screws and/or perforated discs may be incorporated in the barrel 7 of the injector to enable the capillary tube 10 to be accurately centered.

A typical example of the operation of the apparatus is as follows: argon gas is fed into the plasma gas inlet 5 at a rate of five liters per minute and into the insulating gas inlet 2 at a rate of seventeen liters per minute. The end of the coil 3 nearest the open end of the vessel 1 is connected to a source of alternating current of frequency 36 mc./s., the said source having an output power of 1.5 kw., and the other end of the coil 3 is earthed as close as possible to the turn itself in order to reduce the potential difference existing between the bottom end of the work coil and the gas injection point. The efficiency of the coil is improved by pumping a cooling fluid such as water through it. A carbon rod is introduced into the open end of the vessel 1 as far as the jet 9. The rod is heated by high frequency currents produced therein and heats the surrounding gas which is thus ionised sufficiently to initiate a stable plasma which forms an annulus owing to the "skin effect." The rod is withdrawn and the plasma is now maintained by the operation of high frequency eddy currents and capacitively induced currents resulting from the flow of current in the coil. Argon gas is fed into the injector inlet 8 at a rate of five liters per minute. The powder sample is placed in the drum 11, which is rotated by the motor 13 at a rate of about 500 r.p.m. The powder is drawn up the capillary tube 10 and sprayed through the low temperature central region of the plasma to form a tail flame at the open end of the tubular vessel 1. The spectrum of this flame may be analysed using a suitable spectrometer.

The production of the plasma in annular form instead of a plasma ball and the directing of the substance along the axis of the plasma annulus provides a convenient way of bringing the substance into the tail flame region. The use of the tail flame of the plasma to burn the substance is advantageous in that the plasma temperture is frequently higher than is desirable for analysis and in that the temperature of the tail flame can be adjusted by varying the voltage applied across the coil. This flexibility is desirable in view of the fact that the optimum temperature for analysis varies from substance to substance, and the temperature variation is much greater than can be obtained with conventional flame sources, for example air/acetylene burners, and whilst D.C. or A.C. are systems will give higher temperatures than such burners they also produce sample contamination.

Figure 2:
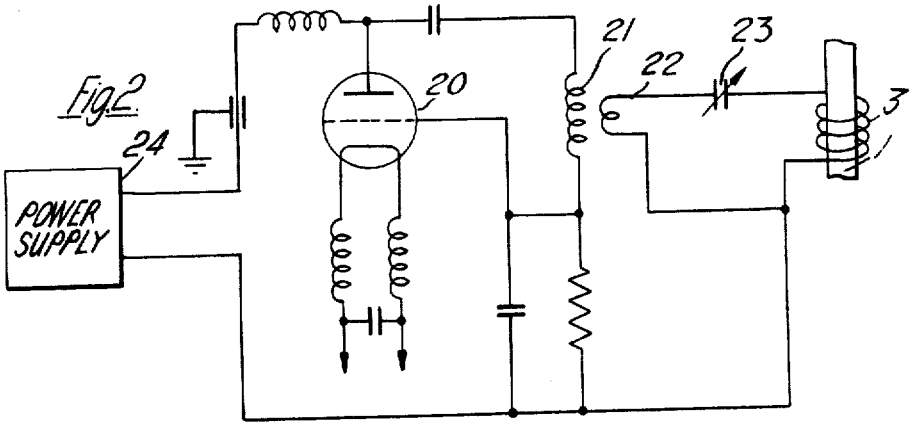
FIG. 2 is a circuit diagram of the high frequency generator which supplies the coil of FIG. 1.

FIG. 2 is a circuit diagram of a typical high frequency generator for use with the plasma-forming apparatus. The oscillator valve 20 has a "tank" circuit including a tank coil 21 in the form of a conductor of wide strip material. The capacitor of the tank circuit is formed primarily by the inter-electrode capacitance of the valve 20. An output coil 22 of side strip is inductively coupled to the tank coil and has one end earthed and the other end connected through a variable capacitance 23 to one end of the work coil surrounding the tube 1. The value of the voltage across the work coil can be adjusted, in accordance with the plasma temperature requirements, by means of the variable capacitor.

If, for the reasons set out above, a modulated high-frequency field is required, the power supply 24 may be constructed with inadequate smoothing. This will provide a modulation of the high-frequency field at twice the frequency of the mains supply.

Figure 3:
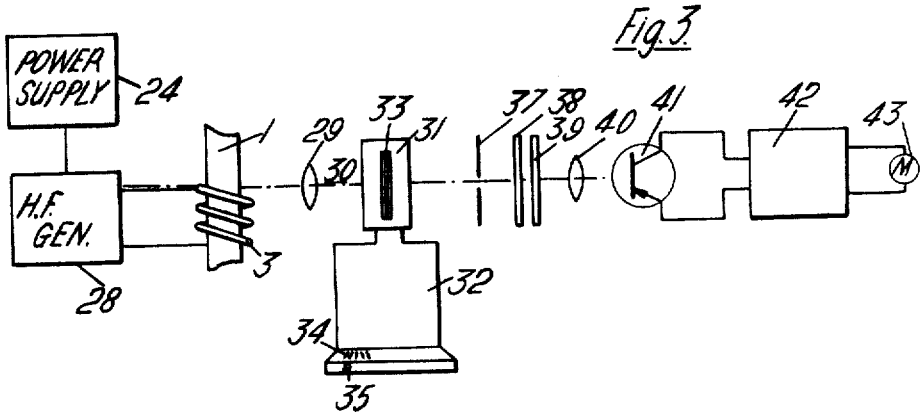
FIG. 3 illustrates diagrammatically apparatus for selecting a particular temperature range of the plasma temperature variation when the output of the high frequency generator is modulated.

An apparatus for selecting a particular plasma temperature, in each cycle of temperature variation produced by the modulated high frequency alternating field, is shown diagrammatically in FIG. 3. In the arrangement of FIG. 3, the coil 3 surrounding the tube 1 is connected to the high frequency generator 28 which is supplied from a power supply 24 which is unsmoothed. The plasma formed within the tube 1 is examined through a lens 29 by means of a stroboscope 30. The stroboscope 30 includes a cylinder 31 which is rotated by a synchronous electric motor 32 and which contains an opening 33 cut through the cylinder 31 parallel to the axis of revolution. The opening is divided by equally spaced narrow slats arranged longitudinally within the opening, the effect of these slats being to provide an extremely rapid cut-off between the point at which the opening 33 is directed at the plasma in the tube 1 and the point at which the opening no longer passes light from the plasma. This permits maximum use to be made of the radiation from the plasma while restricting the time during which radiation is allowed to pass as much as possible in order to achieve greater resolution of the temperature cycle.

The phasing of the movement of the opening 33 with respect to the temperature cycle is shifted by rotation of the motor 32. A scale 34 is provided to facilitate adjustment of the phasing and a locknut 35 enables the motor to be locked into its desired angular position.

Radiation which passes through the stroboscope reaches an entrance slit 37 and thereafter passes through a broad-band optical filter 38 followed by a narrow-band interference filter 39. It is then brought by a lens 40 to a focus at the photo-transistor 41, the output of which is amplified and rectified in the electronic circuit 42 and is then used to energise a galvanometer 43.

The temperature of the sample in the tail flame, as estimated from the degree of ionisation indicated by the relative intensities of the 4226.728 A. and the 3933.666 A. lines of the calcium spectrum, is between 7,000° K. and 7,500° K. approximately.

Statistical analysis of a series of 30 sec. exposures of Ilford N 30 plates with a 0.01 mm. slit, the source being focused with quartz optics, and using a solution containing 20 p.p.m. calcium, showed a relative deviation in the Ca. 3933.666/Ca. 4226.728 ratio of ±2.9% in the tail flame. This corresponds to a very high stability in the radiation emitted by the injected sample.

An alternative to tilted rotating drum of FIG. 1 is a reservoir consisting of a rotating disc with a V-shaped concentric groove into which the solid is poured from a hopper. In a modification particularly suitable for the continuous monitoring of powdered raw materials and/or products of a manufacturing process, the injector draws the solid directly from the moving belt, preferably V-shaped in cross section, by which it is being transported to or from the manufacturing plant.

The sample may also be injected as an aerosol, generally formed by forcing the liquid through an atomiser into a stream of gas, which is passed through a separator, such as a cyclone separator, to remove gross drops of liquid. The aerosol is then injected into the plasma through an injector in the form of a tube. Since the majority of the liquid passing through the atomiser is subsequently removed by the separator, the sensitivity possible using this method is seriously limited and the size of the sample required is fairly large.

Alternatively, the sample may be introduced into the plasma in the form of a wire or a rod of compacted powder. Our invention enables simpler photometers to be constructed than hitherto, and enables a single apparatus to be used for the investigation of spectra emitted at a wide range of different temperatures. It is even possible by means of our invention to use a single source to examine simultaneously the spectra emitted at different temperatures by a given substance.

We claim:

[1. An apparatus for carrying out spectroscopic investigation of a sample, the combination comprising: a first tubular member; a coil surrounding a portion of said first tubular member and thereby defining a plasma-forming region within said member; a high frequency generator for connection to said coil, said coil and its connections being wholly external to said first tubular member; a second tubular member coaxially arranged within said first tubular member to form a first cylindrical channel within said first tubular member; an inlet in said first tubular member for injecting an insulating gas into said first cylindrical channel; a third tubular member coaxially arranged within said second tubular member to form a second cylindrical channel within said second tubular member, said second and third tubular members terminating substantially at said plasma-forming region; an inlet in said second tubular member for injecting a plasma gas into said second cylindrical channel; an inlet in said third tubular member for injecting a carrier gas for a sample, whereby the insulating gas, the plasma-forming gas and the carrier gas flow towards the region of the coil in three coaxial laminar streams and the plasma formed by the plasma-forming gas is of annular form and has a tail flame; and means for passing a sample through one third tubular member to inject the sample into said plasma-forming region, whereby said carrier gas carries the sample through a low temperature central region of said annulus into said tail flame.]

2. Apparatus in accordance with claim [1,] *13*, in which a capillary tube extends through that end of the third tubular member which is remote from the coil, said capillary tube extending substantially to the end of said third tubular member adjacent the plasma-forming region, and in which the end of the third tubular member adjacent the plasma-forming region has a bore of restrictive cross-section to form a jet.

3. Apparatus in accordance with claim [1,] *13*, in which said inlets in said first and second tubular members are tangentially arranged, whereby a rotary motion is imparted to said laminar streams of insulating gas and plasma-forming gas.

4. Apparatus in accordance with claim [1,] *13*, in which the coil has at least two turns and the high frequency generator has an operating frequency lying between 5 and 3000 mc./s.

5. Apparatus in accordance with [1,] *13*, in which the insulating gas is the same as the gas used for the plasma formation.

6. Apparatus in accordance with claim [1,] *13*, additionally comprising a photoelectric device mounted so as to be exposed to said plasma-forming region; means for imposing a cyclic modulation on the amplitude of said high frequency output of said high frequency generator whereby the output of said photoelectric device is correspondingly modulated.

7. Apparatus in accordance with claim 6, in which the frequency of modulation of the high frequency waveform is between 100 and 360 c./s.

8. Apparatus in accordance with claim 6, additionally comprising means for examining radiation from the gas plasma downstream of the point at which the sample is introduced, together with an interrupter for intermittently interrupting the passage of the said radiation from the gas plasma to the examining means; and means synchronizing the operation of said interrupter with the modulation of the high frequency waveform.

9. Apparatus in accordance with claim 6, including a limiter circuit for limiting the amplitude of the modulation peaks of the high frequency waveform applied to the coil.

10. A method for the spectroscopic investigation of a sample, comprising: passing a high frequency alternating current through a coil surrounding a tubular member to define a plasma-forming region in said tubular member; passing along the axis of said coil within said tubular member three coaxial laminar gas flows, an outer insulating gas flow, an intermediate gas flow of a plasma-forming gas and an inner gas flow for forming a passage through the plasma formed by the intermediate gas flow, whereby the plasma is in the form of an annulus coaxial with the coil and has a tail flame; maintaining the three coaxial laminar gas flows separate from one another until they reach the plasma-forming region; introducing into the plasma-forming region means for initiating the formation of a plasma therein when the high frequency alternating current is flowing in said coil; withdrawing the plasma initiating means from said plasma region once the plasma has been started; introducing a sample into said inner gas flow and thereby injecting said sample through a low temperature central region of said annulus into said tail flame; and examining the spectrum of the plasma downstream of the point at which said sample was introduced.

*11. A method for the spectroscropic investigation of a sample, comprising: passing a high frequency alternating current through a coil surrounding a tubular member to define a plasma-forming region in said tubular member; forming an annular plasma surrounding a low temperature substantially central region and a tail flame by: passing along the axis of said coil within said tubular member three coaxial laminar gas flows which include an outer insulating gas flow, an intermediate gas flow of a plasma-forming gas and an inner gas flow for forming a passage through the plasma formed by the intermediate gas flow, whereby the plasma is in the form of an annulus coaxial with the coil and has a tail flame; maintaining the three coaxial laminar gas flows separate from one another until they reach the plasma-forming region; introducing into the plasma-forming region means for initiating the formation of a plasma in the plasma-forming region when the high frequency alternate current is flowing in said coil; withdrawing the plasma initiating means from said plasma region once the plasma has been started; introducing a sample into said inner gas flow and thereby injecting said sample through the low temperature central region surrounded by said annulus into said tail flame; and examining the spectrum of the plasma downstream of the point at which said sample was introduced.*

*12. A method in accordance with claim 11, in which the step of forming the annular plasma includes tangentially introducing the plasma-forming gas and the insu-*

*lating gas relative to the axis of said coil and tubular member, to impart a rotary motion to the laminar streams of plasma-forming gas and insulating gas.*

*13. Apparatus for carrying out spectroscopic investigation of a sample, comprising:*

*a first tubular member;*

*a coil which surrounds a portion of said first tubular member and defines a plasma-forming region within said first tubular member;*

*a high frequency generator coupled to said coil for supplying electrical energy to said coil at a predetermined frequency and power, said coil and its connections being wholly external to said first tubular member;*

*a second tubular member coaxially arranged within said first tubular member to form a first cylindrical channel within said first tubular member;*

*an inlet in said first tubular member for injecting an insulating gas at a given rate into said first cylindrical channel;*

*a third member coaxially arranged within said second tubular member to form a second cylindrical channel within said second tubular member, said second and third tubular members terminating substantially at said plasma-forming region;*

*means for producing an annular plasma having a low temperature substantially central region and a tail flame, including:*

*an inlet in a side wall portion of said second tubular member remote from said plasma-forming region for injecting a plasma gas at a given rate into said second cylindrical channel such that said injected plasma gas flows along said second cylindrical channel toward said plasma-forming region;*

*an inlet in a side wall portion of said third tubular member remote from said plasma-forming region for injecting a carrier gas for a sample;*

*said given rates of injection of said insulating gas and plasma gas, and said predetermined frequency and power of said high frequency generator being such that: (i) the insulating gas, the plasma gas and the carrier gas flow in their respective channels towards the region of the coil in three coaxial laminar streams, and (ii) the plasma formed by the plasma gas at the plasma-forming region is of annular form and has a tail flame; and*

*means for passing a sample through said third tubular member with said carrier gas to inject the sample into the central region of said annular plasma in said plasma-forming region, whereby said carrier gas carries the sample through said low temperature substantially central region surrounded by said annular plasma and then into said tail flame.*

*14. Apparatus in accordance with claim 13 further comprising spectroscopic examination means positioned to determine the spectrum of said sample in the region of the tail flame.*

* * * * *